Sept. 13, 1955 S. A. SWICKER 2,717,951
TOASTER

Filed Oct. 11, 1954 3 Sheets-Sheet 1

INVENTOR
Stanley A. Swicker

Sept. 13, 1955 S. A. SWICKER 2,717,951
TOASTER
Filed Oct. 11, 1954 3 Sheets-Sheet 2
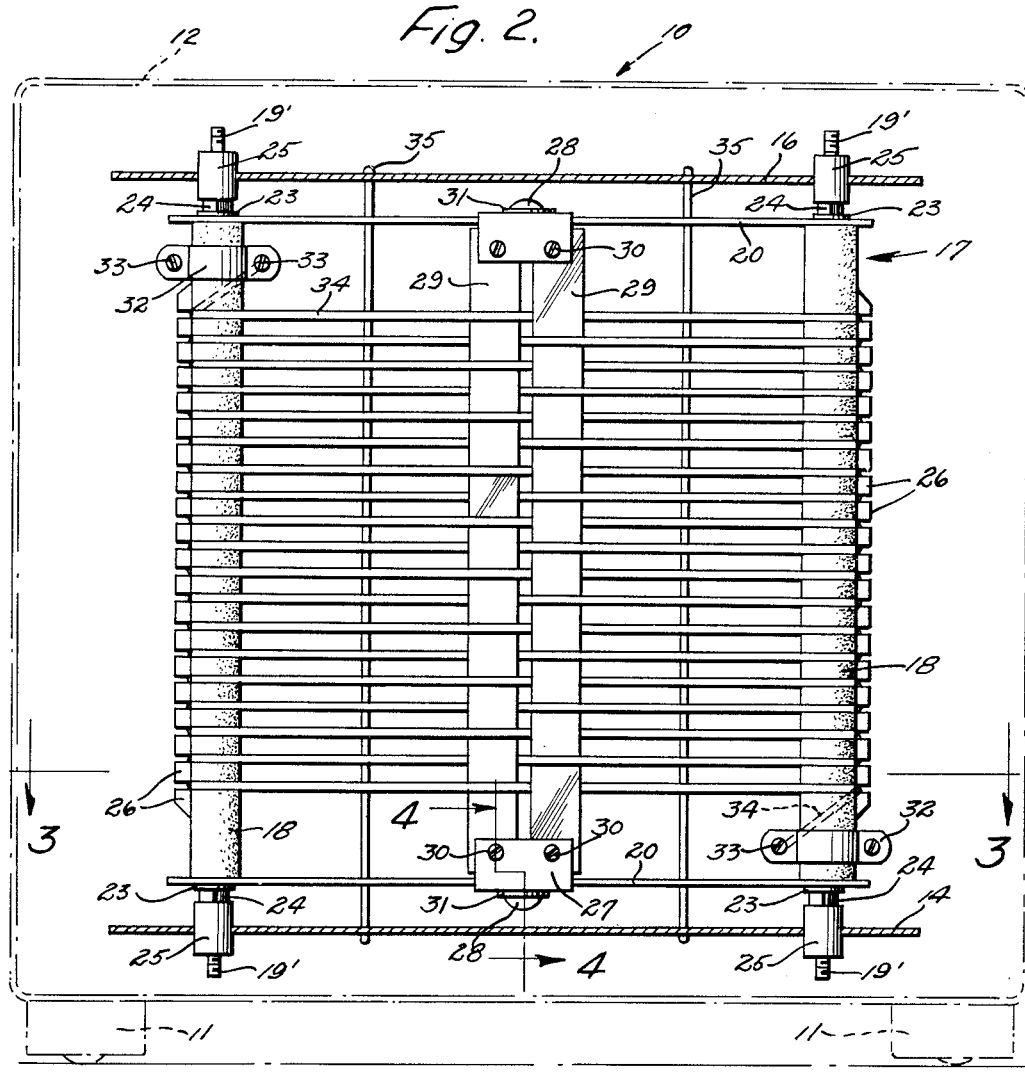
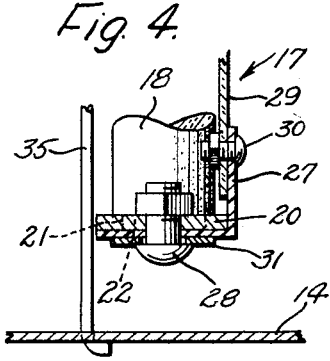
INVENTOR
Stanley A. Swicker Sept. 13, 1955  S. A. SWICKER  2,717,951
TOASTER Filed Oct. 11, 1954  3 Sheets-Sheet 3

INVENTOR

Stanley A. Swicker

United States Patent Office 2,717,951
Patented Sept. 13, 1955

2,717,951
TOASTER

Stanley A. Swicker, Luzerne, Pa.

Application October 11, 1954, Serial No. 461,316

3 Claims. (Cl. 219—19)

This invention relates to electric toasters.

It is an object of the present invention to provide a multiple electric toaster that will enable the user to prepare more than two slices of toast in less time than it would take with the common two-slice toaster.

It is another object of the present invention to provide a multiple electric toaster of the above type which will effect an economy of time as well as electric power consumption.

It is still another object of the present invention to provide a multiple electric toaster of the above type wherein only those heating elements required for toasting the particular number of slices of bread inserted will be energized, which effects a saving of substantially one-half the electricity normally consumed.

It is still another object of the present invention to provide a multiple electric toaster of the above type which may have a plurality of compartments in excess of four and which is readily and easily adapted for use in public eating places.

It is still another object of the present invention to provide a multiple electric toaster having a novel heating element frame construction and method of operation of the same, as well as a circuit therefor.

Other objects of the present invention are to provide a multiple electric toaster bearing the above objects in mind which is of simple construction, inexpensive to manufacture, has a minimum number of parts, is easy to use and efficient in operation.

For other objects and a better understanding of the invention, reference may be had to the following detailed description taken in connection with the accompanying drawing, in which:

Fig. 2 is a transverse sectional view thereof taken along the line 2—2 of Fig. 1; and showing the external casing in phantom;

Fig. 4 is a fragmentary enlarged vertical sectional view taken along the line 4—4 of Fig. 2;

Figure 1:
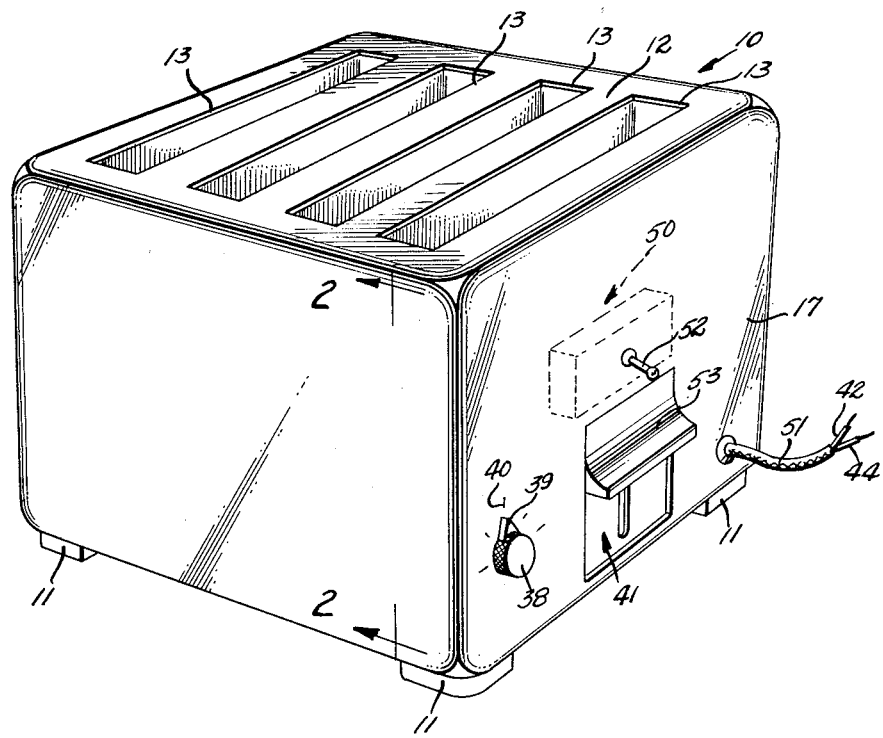
Figure 1 is a perspective view of a preferred embodiment of the present invention.

Referring now more in detail to the drawing, 10 indicates generally the outer shell or casing of the toaster supported on the usual legs or feet 11 at each corner, the top wall 12 of the shell 10 being provided with a plurality of longitudinally spaced openings 13 adapted to receive downwardly therethrough a slice of bread or the like.

As shown in Fig. 2, an inner frame is provided and comprises a lower supporting plate 14 suitably supported above the bottom wall 15 of the outer shell and an upper supporting plate 16 likewise suitably supported in freely spaced relationship to the top wall 12, the supporting plates 14 and 16 extending substantially the length of the shell therewithin and having openings registering with the openings 13 to permit the downward insertion of the bread. The supporting plates 14 and 16 terminate short of the end walls 17 of the outer shell to provide end compartments for a purpose which will hereinafter become clear.

A plurality of longitudinally spaced heating element frames indicated generally at 17 are mounted intermediate the plates 14 and 16 and are adapted to receive downwardly therebetween the slices of bread to be toasted. Each of these heating element frames 17 is identical in construction and therefore only one will be described in detail.

Each heating element frame 17 includes a pair of porcelain uprights 18, each of the uprights 18 having a portion 19 therethrough within which is positioned an elongated rod 19' the opposite ends of the rod 19' extending beyond the ends of the uprights and being externally threaded.

The oppositely disposed pairs of uprights 18 are connected at their upper and lower ends to each other by means of the bars 20, each of the bars 20 at the opposite end thereof having an oval shaped cutout 21 which receives downwardly therewithin the correspondingly shaped, reduced ends 22 of the uprights, thus preventing angular displacement of the uprights relative to the bars 20.

The ends of the bars 20 are secured to the adjacent ends of the uprights by means of lock washers 23 and nuts 24, the latter being screwed onto the externally threaded ends of the rods as shown in Fig. 2.

The opposite ends of the rods 19 are supported within the porcelain sleeves 25 suitably mounted in the supporting plates 14 and 16.

Each of the uprights 18 along its outer edge is integrally formed with the vertically spaced teeth 26 which provide therebetween a plurality of vertically spaced grooves for a purpose which will hereinafter become clear.

An angle bracket 27 is secured to the central portion of each of the bars 20 by means of a nut and bolt assembly 28 and cooperate with each other to mount therebetween the mica strips 29 by means of the nut and bolt assembly 30, the strips 29 being spaced slightly apart as shown in Fig. 2. A washer 31 is disposed between the head of the nut and bolt assembly 28 and the horizontal portion of the brackets 27 (Fig. 4).

Figure 3:
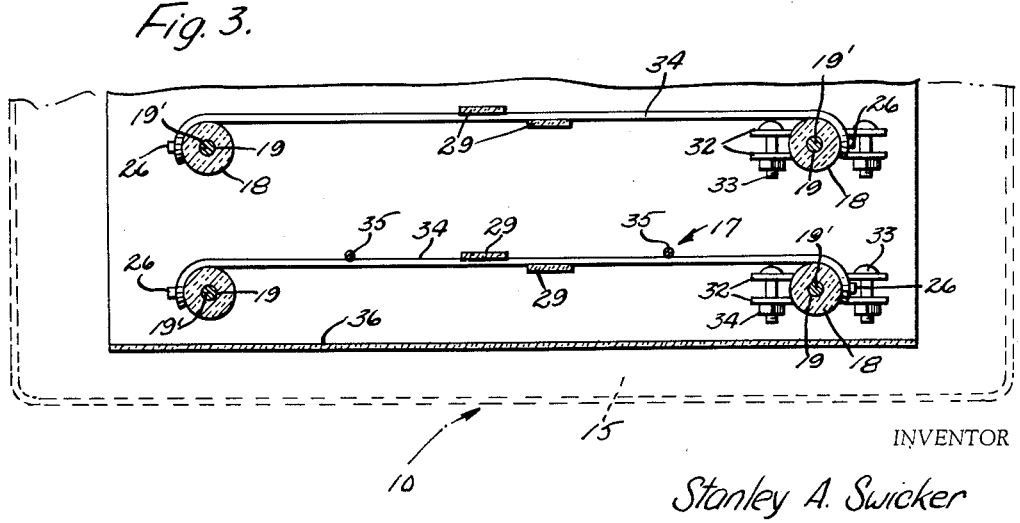
Fig. 3 is a horizontal sectional view taken along the line 3—3 of Fig. 2.

Each of the uprights 18 is provided at opposite ends with an annular groove which serves to position the complementary pairs of brackets 32, the ends of which are connected by nut and bolt assembly 33 (Fig. 3). The clamps 32 and nut and bolt assembly 33 are formed of electrically conductive material.

A heating coil is formed by a continuous length of electrically high resistant wire 34 which is threaded within the grooves of the uprights passing laterally between the adjacent edges of the mica strips 29, substantially as indicated in Fig. 2, the opposite ends of the wire 34 being connected to the nut and bolt assembly 33. The other nut and bolt assemblies 33 of each of the sets of brackets 32 are connected to the electrical circuit of the toaster.

Straight guides 35 are secured at opposite ends within the supporting plates 14 and 16 in the manner shown, the straight guides being preferable over the so-called irregular or bent type of guides by permitting a compact construction.

The opposite ends of the supporting plates 14, 16 are connected by sheets 36 (Fig. 3) of heavy sheet mica or tempered asbestos whereby to firmly insulate the outer sides of the endmost heating coils 34 from the ends of the shell 17.

Figure 5:
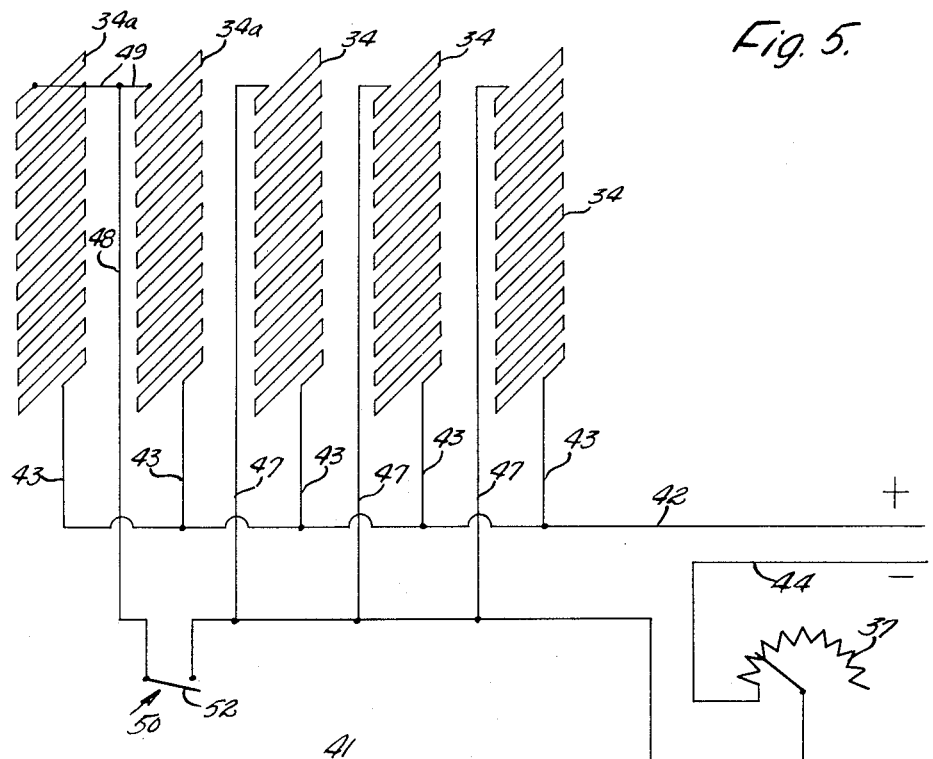
Fig. 5 is a circuit diagram of the device.
Figure 6:
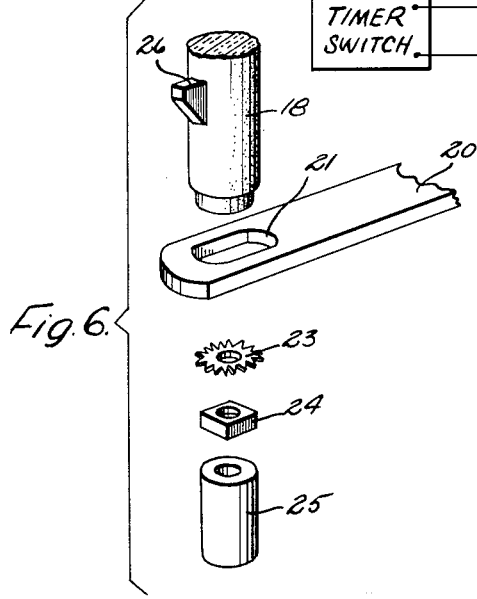
Fig. 6 is a fragmentary exploded perspective view of a portion of the device.

As shown in Figs. 1 and 5, the shell 10 is of conventional design and includes a rheostat 37 controlled by an external knob 38 carrying an indicator 39 which cooperates with the scale 40 provided on one of the end walls 17. The usual timer switch mechanism indicated generally at 41 is mounted within the end compartments and is connected in series with the rheostat 37, the timer switch being tripped or closed upon the depositing of the slice of bread whereby to close the circuits in a manner well known to those skilled in the art.

As shown in Fig. 4, one terminal of each of the heating coils 34 is connected onto one of the power lines 42 by means of the conductors 43.

In the further practice of my invention, means are provided for selectively energizing only certain of the heating coils 34 when it is desired to toast less than the maximum number of slices of bread. The other power line 44 is connected to one terminal of the rheostat 37, the other terminal of the rheostat 37 being connected to one terminal of the timer switch mechanism 41 by means of a conductor 45. The other terminal of the timer switch mechanism 41 is connected to a power line or conductor 46 and to which the three righthand heating coils (Fig. 5) are connected in parallel by means of the conductors 47. However, the other two endmost heating coils 34a are both connected to a line 48 by means of the conductors 49, the line 48 being connected to one terminal of a toggle switch indicated generally at 50 and mounted within the end compartment above the timer switch mechanism 41. The other terminal of the toggle switch 50 is connected to line 46 to complete the circuit. Thus, all of the coils 34 are connected in parallel with each other and in series with the timer switch mechanism 41 and rheostat 37, the lines 42 and 44 being connected to a suitable source of household power by the usual male plug, not shown, having an insulated covering 51 (Fig. 1) and passing inwardly through an opening in one of the end walls 17 suitably provided. However, two of the coils 34a are connected in series with the toggle switch 50 so that upon the closing of the timer switch 41 and the opening of the toggle switch 50, only three of the coils 34 will be energized to adapt the toaster for only two slices of bread and effecting an economy of electricity of substantially one-third the amount which would otherwise be consumed if all coils were energized. The toggle switch 50 includes an external, manually operable button 52 controlling the same and located above the usual end handle members 53. Thus, upon closing the toggle switch 50 by means of the button 52, all of the coils 34 and 34a will be energized upon closing of the timer switch mechanism 41, the rheostat 37 controlling the amperage and thereby the intensity of the heat in the usual manner.

While the drawing has been directed to five heating coils, it will be readily apparent that any greater number may be employed and that selective groups thereof may be energized by providing additional toggle switches 50, without departing from the spirit and scope of the invention in any way.

It will be noted that the rods 19' extend the entire length of the uprights 18, to support the frame in the event that the uprights should become accidentally broken.

The openings 13 provided in the top wall 12 will preferably be brought closer together to provide a more compact unit.

Also, it will be noted from an inspection of Fig. 3 that the resistance wires 34 are disposed on the same sides of the uprights 18. In the heating element frame, not shown, at the end remote from that shown in Fig. 3, the high resistance wires 34 in the endmost frame will be disposed on the inside of the uprights 18. It will also be noted that the frames 17 are so constructed that the heat radiates on both sides thereof.

The uprights 18 may also be formed of tempered asbestos.

A lip, not shown, may be provided in the end wall 17 directly above the button 52 to provide the thumb with pressure as the button is flipped upwardly. In other words, such a lip, when the thumb is resting on it, will prevent the lifting of the toaster when the switch button 52 is flipped upwardly. It will also be noted that the heating coils 34 are disposed on only one side of the respective pairs of uprights 18.

While various changes may be made in the detail construction, it shall be understood that such changes shall be within the spirit and scope of the present invention as defined by the appended claims.

What I claim as new and desire to protect by Letters Patent of the United States is:

1. In a multiple electric toaster, a heating frame comprising a pair of uprights of refractory material, a bottom supporting plate, an upper supporting plate, said uprights being adapted to be received intermediate said upper and lower supporting plates with the ends thereof freely spaced therefrom, said upper supporting plate having openings therethrough adapted to permit the downward insertion of a slice of bread or the like, a pair of elongated bars, said bars at opposite ends having elongated openings therethrough, said uprights at opposite ends having correspondingly shaped reduced extensions adapted to fit within said openings in said bars whereby to prevent radial displacement of said uprights relative to said bars, each of said uprights having a central longitudinal bore extending from end to end thereof, an elongated rod disposed within each of said bores, each of said rods having externally threaded ends extending beyond the ends of said uprights, lock washers on said externally threaded ends adjacent said bars and nut means adjacent said lock washers screwed into said abutment with said bars from opposite ends of said rods, refractory members mounted in said supporting plates, said refractory members having bores receiving the opposite ends of said rods therethrough, and a continuous high resistance wire for each pair of said uprights and means for mounting said wire across said uprights.

2. In a multiple toaster according to claim 1, said means for mounting said high resistance wires across said uprights comprising longitudinally spaced teeth integrally formed on the outer sides of each of said uprights and providing a plurality of longitudinally spaced grooves, said high resistance wires being threaded laterally within said grooves from top to bottom of said uprights, each of said uprights at alternate ends having annular grooves, complementary brackets of conductive material disposed about each of said grooves, nut means for securing the ends of said brackets together, the ends of said high resistance wires being connected to one of the nut means of each of said brackets, the other nut means of each of said brackets being connected to the circuit of the device.

3. In a multiple toaster according to claim 2, angle brackets mounted at the central portions of each of said bars, a pair of elongated mica strips having their opposite ends secured to said angle brackets, said high resistance wire being threaded between the adjacent ends of said mica strips, mica sheets connecting the opposite ends of said supporting plates whereby to firmly insulate said heating frames from the end walls of the toaster casing, and a pair of straight guide rods secured at opposite ends of said supporting plates.

References Cited in the file of this patent

UNITED STATES PATENTS

| | | |
|---|---|---|
| 1,560,578 | Hummel et al. | Nov. 10, 1925 |
| 1,602,804 | Wilkinson et al. | Oct. 12, 1926 |
| 2,106,269 | Brosseau et al. | Jan. 25, 1938 |
| 2,459,170 | Koci | Jan. 18, 1949 |
| 2,462,607 | Browne | Feb. 22, 1949 |
| 2,659,798 | Oluing | Nov. 17, 1953 |